W. W. McCALL.
ANTI-SIDE-DRAFT DEVICE FOR PLOWS.
APPLICATION FILED APR. 12, 1909.
984,581.
Patented Feb. 21, 1911.
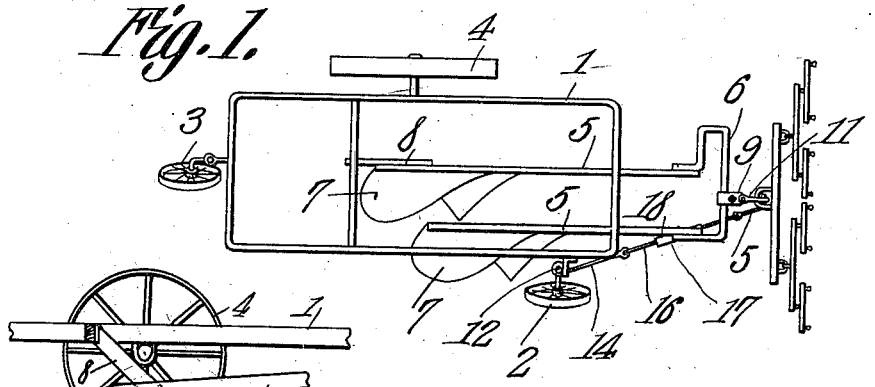
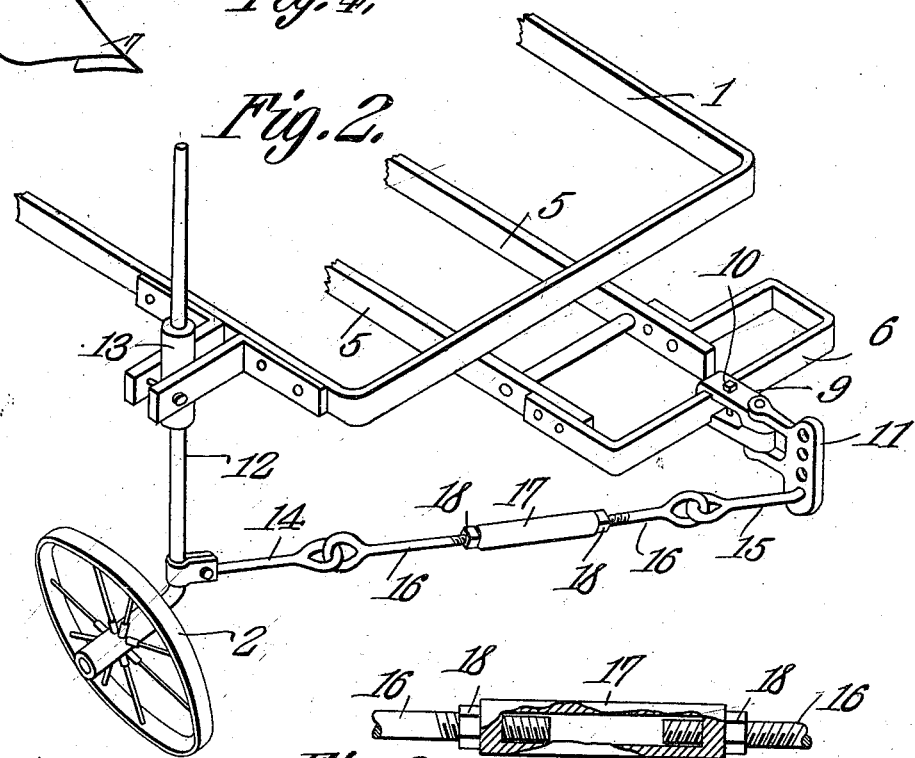
Witnesses
Inventor
Weston W. McCall,
By C. A. Snow & Co.
Attorneys

UNITED STATES PATENT OFFICE.

WESTON W. McCALL, OF FERRIS, ILLINOIS.

ANTI-SIDE-DRAFT DEVICE FOR PLOWS.

984,581.  Specification of Letters Patent.  Patented Feb. 21, 1911.

Application filed April 12, 1909. Serial No. 489,334.

*To all whom it may concern:*

Be it known that I, WESTON W. McCALL, a citizen of the United States, residing at Ferris, in the county of Hancock and State of Illinois, have invented a new and useful Anti-Side-Draft Device for Plows, of which the following is a specification.

This invention has relation to anti-side draft devices for plows, and it consists in the novel construction and arrangement of its parts, as hereinafter shown and described.

The object of the invention is to provide a draft means adapted to be applied to breaking plows, and specially adapted to be applied to such plows wherein a gang or series of furrow-openers is employed, for the purpose of eliminating side draft. In this type of plow it is usually found that the major portion of the frame is supported upon furrow and ground wheels, and that the rear portions of the plow beams are guided by the frame, but are not positively connected thereto. It is usually the case that the draft animals are hitched directly to the beam or beams, and through the movement of the beams, the frame is pulled. In the present instance a connection is provided between the clevis, which is pivotally connected with the forward portion of the beam or beams and the forward portion of the frame at the furrow side thereof, whereby the draft strain or pull is divided at the forward portion of the beam or beams between the same and the frame. Thus, while the draft pull or strain is applied directly to the beam or beams in the line of draft or parallel with the line of draft, the draft strain or pull is applied to the forward portion of the frame at an angle to the line of draft, and the said pull or strain to the frame has a tendency to hold the furrow wheels of the frame in proper position against the vertical sides of the furrows, and thus tendency of the plow shares or land sides thereof to have side draft is eliminated.

In the accompanying drawings:—Figure 1 is a plan diagrammatic view of a plow-frame, a gang of beams, and the draft means applied thereto. Fig. 2 is a perspective view of the forward portion of a gang of beams, and a plow-frame, with the draft means applied thereto. Fig. 3 is a detail sectional view of a portion of the draft means. Fig. 4 is a fragmentary section on line 4—4 of Fig. 1.

As illustrated in Figs. 1 and 2 of the drawings, the plow-frame 1 is mounted upon a front furrow-wheel 2, a rear furrow-wheel 3, and a land wheel 4. The construction of the frame and the arrangement of the said supporting wheels may be of any approved form. Located under the frame 1 are the plow-beams 5. A clevis support 6 connects the forward ends of the beams, and each beam 5 carries, at its rear end, a plow 7. The rear portions of the beams 5 are guided with relation to the frame 1 by the usual arm or guide 8, and while the rear portions of the plow-beams 5 are free to move vertically with relation to the frame 1, they are held against lateral movement with relation to the said frame toward the unbroken land by means of the guide 8. The said guide 8 is that usually found in plows of this character as a means for guiding the beam or beams, and is illustrated in Fig. 4 as a rigid arm extending obliquely downward and forward from a cross bar within the frame 1 and against which one of the beams 5 bears laterally; the other beam 5 being rigidly connected with the first said beam. Clamp plates 9 are adjustably mounted upon the clevis support 6 and are held in adjusted position by means of a clamp bolt 10 which passes transversely through the said plates 9, and is adapted, when tightened, to hold the said plates in fixed position upon the clevis support 6. A clevis 11 is pivotally connected with the forward ends of the plates 9 and is of any usual pattern. A standard 12, upon which the furrow wheel 2 is journaled, passes vertically through a bearing 13, which is carried by the frame 1, and it is to the upper end portion of this standard 12 that a guiding tongue may be attached, if such tongue be necessary. In the application of the plow draft means the said standard is to be considered a component part of the frame 1.

The plow frame draft means (hereinafter to be explained in detail) is connected at its forward end with the clevis 11, and at its rear end with the standard 12, upon which the furrow-wheel 2 is journaled. Or, the rear end of the frame draft means may be connected with any other part of the frame 1 at the furrow side thereof. As shown in the drawings the said draft means consists of end links 14 and 15, the link 14 being connected with the standard 12, and the link 15 with the clevis 11 at a point in advance of the pivotal connection between the clevis and the plates 9. Links 16 are pivotally connected with the inner ends of the links 14 and 15 respectively, and the inner ends of the said links 16 are connected together by an adjusting turn-buckle 17 or its equivalent, in the form of a collar. Jam nuts 18 are screw-threaded upon the inner ends of the links 16, and are adapted to be brought in close contact with the end of the turn-buckle 17 after the same has been adjusted to proper position upon the inner portions of the links 16.

From the above description it will be seen that when draft animals are attached to the clevis 11 and the draft strain is applied thereto, the clamp plates 9 having been previously adjusted along the clevis support 6, the draft strain is applied directly in the line of draft with the plow beams 5, or parallel with the said line of draft. At the same time, a portion of the draft pull or strain is transmitted through the links 14, 15 and 16 to the standard 12, or the furrow side of the frame 1, and as the said strain is at an angle to the line of draft to the beam or beams 5, the furrow wheel 2 is kept close against the land side of the furrow. At the same time, there is a certain amount of forward pull or strain upon the frame 1, applied to its forward portion by reason of the inclination of the connection between the standard or the frame 1 and the clevis 11 with relation to the line of draft of the beams 5. By this arrangement it will be seen that the forward movement of the frame 1 does not depend upon connection between said frame and the rear portions of the plow beams 5, but that the said frame 1 derives its forward movement through strain applied to the forward end portion through the connection between standard 12 and the clevis 11. Furthermore, the furrow wheels which, in part, support the frame 1, are firmly held against the vertical walls of the furrows, and the guide 8 prevents the land sides of the plows 7 from having undue frictional contact with the vertical walls of the furrows, or what is generally known as "side draft".

It will also be seen that when the clamp plates 9 are adjusted along the clevis support 6 the links 16 may be brought toward each other and secured in adjusted position by means of the turn-buckle 17 and the jam nuts 18, or the said links 16 may be moved away from each other and secured as indicated. By reason of the pivotal connection between the links 14, 15 and 16, a certain amount of flexibility is provided in the connection between the standard 12 and the clevis 11, so that the clevis may turn without turning the standard 12 on its axis, and when a guiding tongue is applied to the standard 12, the said standard upon the other hand, may be turned upon its axis without affecting the clevis 11. Thus, it will be seen that the connection between the standard 12 and the clevis 11 is in no form a means for steering the furrow-wheels 2 and 3 or for swinging the same about an axis, and is not intended to establish rigid connection between the forward end of the frame 1 and the plow-beams 5, but is intended solely for the purpose of distributing the draft strain or pull between the plow beams and the forward portion of the plow frame, so that the plow frame will be held in proper position with relation to the vertical sides of the furrow or furrows. It will therefore appear that the specific structure of the connection between the frame and the clevis 11 is immaterial, that form which is shown being preferred inasmuch as it provides means whereby the said connection may be longitudinally extended or contracted as desired, and can therefore be accommodated in length to effectually operate upon the clevis 11 or in connection with the said clevis, irrespective of the position that the clamp plates 9 may have upon the clevis support 6.

Having described my invention, what I claim as new, and desire to secure, by Letters Patent, is:—

In combination with a plow frame having furrow wheels and a land wheel, a guide depending rigidly from the frame, a beam resting at its rear portion against the furrow side of said guide and movable at its forward end independently of said frame, a furrow opener carried at the rear end of the beam and directing the latter against said guide, a clevis attached to the forward end of the beam, and a draft means connected at its forward end with the clevis at a point in advance of the attachment between the clevis and the beam and at its rear end to the forward portion of the plow frame at the side thereof toward which the furrow slice is cast.

In testimony that I claim the foregoing as my own, I have hereto affixed my signature in the presence of two witnesses.

WESTON W. McCALL.

Witnesses:
JUNIUS C. FERRIS,
FRED W. SYMONDS.